(12) United States Patent
Pyntikov et al.

(10) Patent No.: US 6,802,385 B2
(45) Date of Patent: Oct. 12, 2004

(54) ELECTRICALLY POWERED VEHICLES HAVING MOTOR AND POWER SUPPLY CONTAINED WITHIN WHEELS

(75) Inventors: Alexander V. Pyntikov, Ashburn, VA (US); Mark A. Benson, Leesburg, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 10/146,024

(22) Filed: May 16, 2002

(65) Prior Publication Data

US 2003/0213630 A1 Nov. 20, 2003

(51) Int. Cl.⁷ ............................................... B62M 7/00
(52) U.S. Cl. .................. 180/220; 180/65.5; 310/156.12
(58) Field of Search ............................... 180/65.5, 65.6, 180/65.1, 65.2, 65.8, 907, 220, 221, 65.4, 65.3, 206; 310/171, 156.12, 301, 268, 206, 201, 265, 266, 156.26, 156.48–156.65, 67 A, 254

(56) References Cited

U.S. PATENT DOCUMENTS

| | | | | |
|---|---|---|---|---|
| 4,319,152 A | * | 3/1982 | van Gils | 310/201 |
| 4,860,176 A | * | 8/1989 | Bauwens et al. | 310/171 |
| 5,581,136 A | | 12/1996 | Li | |
| 5,874,792 A | * | 2/1999 | Chen et al. | 310/268 |
| 6,007,447 A | * | 12/1999 | Lin | 180/206 |
| 6,011,337 A | * | 1/2000 | Lin et al. | 310/268 |
| 6,092,615 A | | 7/2000 | Pusch et al. | |
| 6,247,548 B1 | * | 6/2001 | Hayashi et al. | 180/65.3 |
| 6,486,582 B1 | * | 11/2002 | Patarchi | 310/268 |
| 6,492,756 B1 | * | 12/2002 | Maslov et al. | 310/156.12 |
| 6,580,188 B2 | * | 6/2003 | Katagiri et al. | 180/65.5 |
| 2002/0100625 A1 | | 8/2002 | Beltrame et al. | |

FOREIGN PATENT DOCUMENTS

| | | | |
|---|---|---|---|
| DE | 818 737 | 10/1951 | |
| DE | 197 32 430 | 2/1999 | |
| DE | 298 08 758 | 9/1999 | |
| EP | 463168 A1 * | 1/1992 | ............ B60K/7/00 |
| EP | 0 696 537 | 2/1996 | |
| EP | 0 807 570 | 11/1997 | |
| EP | 1 137 154 | 9/2001 | |
| FR | 2 387 139 | 11/1978 | |
| WO | WO 99/30960 | 6/1999 | |

* cited by examiner

*Primary Examiner*—Brian L. Johnson
*Assistant Examiner*—Hau Phan
(74) *Attorney, Agent, or Firm*—McDermott Will & Emery LLP (57) ABSTRACT

An electrically powered vehicle has a motor, controller and power supply contained within a wheel compartment. A cylindrical stator frame is fixed on the wheel axle, with an inner surface of the stator frame defining a space for housing the power supply and controller circuitry. A plurality of electromagnet stator segments are mounted on an outer surface of the stator frame. A cylindrical rotor frame is coupled to the axle through bearings. An inner surface of the rotor frame supports a plurality of permanent magnets that surround the stator segments to form a radial air gap therebetween. Mounted to the outer surface of the rotor frame by appropriate supporting structure is a vehicle tire.

9 Claims, 8 Drawing Sheets

ELECTRICALLY POWERED VEHICLES HAVING MOTOR AND POWER SUPPLY CONTAINED WITHIN WHEELS

RELATED APPLICATION

This application contains subject matter related to copending U.S. application Ser. No. 09/993,596 of Pyntikov et al., filed Nov. 27, 2001 and Ser. No. 09/996,102 of Maslov et al., filed Oct. 1, 2001. The disclosure of these copending applications are incorporated by reference herein.

FIELD OF THE INVENTION

The present invention relates to electrically powered vehicles, more particularly to vehicles in which drive motor elements, control circuits and power supply are contained within one or more vehicle wheels.

BACKGROUND

The above identified Pyntikov et al. and Maslov et al. applications describe the development of efficient battery powered electric motor drives that may be advantageously employed in vehicles and other environments. The applications address the challenges of attaining smooth operation over a wide speed range, while maintaining a high torque output capability at minimum power consumption. Electronic control of pulsed energization applied to motor windings, by precisely varying pulse width, duty cycle, and switched application of a battery source, provides a wide functional versatility and flexible management of motor characteristics.

While the complexity of electronic elements can be extensive and diverse, the need is recognized for a motor structural configuration in which the control elements that provide such operation are self-contained. Such a configuration should not be made at a sacrifice in performance of the motor flux producing structure within a given constituent of the motor. The Pyntikov et al. and Maslov et al. applications contemplate configurations in which the stator is formed of a plurality of individual power modules and corresponding core segments, each module comprising electrical control and drive elements supplied by a power source incorporated within the stator. Such parallel architecture provides relatively independently controlled functionality for each module. Performance of each module individually may be measured in situ during normal operation or by running more extensive, software controlled, diagnostic routines. Based on test results, a module can be automatically recalibrated, disconnected, or flagged for repair or replacement. Overall motor performance, determined by combining the characteristics of the independent modules, can be compared to original benchmarks to analyze various repair options for devising the minimum necessary action.

In environments in which portability and size are important factors, such as bicycles, tricycles, motorcycles and the like, a vehicle motor drive should advantageously provide ready accessibility to the various structural components for replacement of parts at a minimum of inconvenience. Smaller vehicles present additional challenges to incorporate motor controls, which can be sophisticated, motor structure and one or more power supplies within a limited available space. For example, a power source must be provided that has a sufficient capacity for satisfactory operation of a vehicle drive such as described above while satisfying rather severe space and weight requirements of small vehicles. The need exists for providing such a power source within the confines of the vehicle structure while also being unobtrusive to the user.

DISCLOSURE OF THE INVENTION

The present invention fulfills the above described needs, at least in part, by provision of an electrically powered vehicle, for example a bicycle, having a motor, controller, power supply and charger contained within a wheel compartment. A cylindrical stator frame is fixed on the wheel axle, with an inner surface of the stator frame defining a space for housing the power supply. A plurality of electromagnet stator segments are mounted on and distributed about an outer surface of the stator frame. A cylindrical rotor frame is coupled to the axle through bearings. An inner surface of the rotor frame supports a plurality of permanent magnets distributed about the surface and surrounding the stator segments to form a radial air gap therebetween. The outer surface of the rotor frame supports a tire that is mounted thereon via a supporting structure such as a bicycle spoke frame or that may be mounted thereon directly. The motor, power supply and motor control circuit may all be contained within a front or back wheel hub of a bicycle that is readily accessible. For particulars of various rotor and stator structural configurations and a motor control scheme for generating electromotive force, reference is made to the above-identified patent applications.

The power supply requirements are dependent upon vehicle variables, such as size and weight, as well as the particular motor structural configuration and desired operating characteristics. The power supply may comprise a plurality of standard battery cells, such as D-cells, which can be replaced easily when necessary with readily available cells. An advantage of such cells is that they are readily available, as are rechargeable batteries. With easy access, the batteries can be exchanged with other rechargeable batteries and stored for reuse later. With appropriate connection of the batteries to an external portion of the wheel, the batteries can be recharged in situ, without the need for taking apart the wheel.

A further advantage of the invention is that additional battery cells may be contained within storage space in a second wheel and coupled, via an electrical cable carried by the vehicle frame, to the motor drive in the first wheel. Provision of commonly available batteries in both wheels broadens the range of useful operating environments to include more rugged vehicles or multi-passenger vehicles. Depending on the particular design characteristics of the motor, the cells all may be connected in appropriate parallel and/or series/parallel configurations.

As an added feature, a switch may be provided in the cable circuit to permit selective connection of the cells in the second wheel to the motor and its controller. Smaller vehicles may not require the simultaneous connection of all the batteries at all times. During periods of light use or when the first wheel contains new or newly charged batteries, connection of the second wheel batteries may be opened by the switch, thereby conserving the power supply. These batteries may be switched into circuit during higher torque requirements, for example travel at a severe uphill gradient or when carrying an additional passenger and/or heavy loads. The batteries in the second wheel thus comprise a reserve power supply that can also be switched into circuit when the batteries in the first wheel indicate a loss of power after a period of use.

The reserve power supply can be contained in a front bicycle wheel, which can easily be removed from the vehicle without disturbing the rear wheel. Removal of the rear wheel is more cumbersome due to the added weight of the motor components and its interconnection with the bicycle chain. The front wheel batteries can be easily taken to a remote location where the batteries can be recharged or replaced. Replacement of the front wheel with the new or recharged power supply allows prolonged use of the vehicle so that attention to the rear wheel can be delayed to a more convenient time.

Yet another aspect of the invention is the provision of a motor, controller, charger and power supply in each of a plurality of wheels of the vehicle. This "all wheel drive" functionality permits a greater range of control of the vehicle for better traction and torque distribution, and adds a level of redundancy to the drive system.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
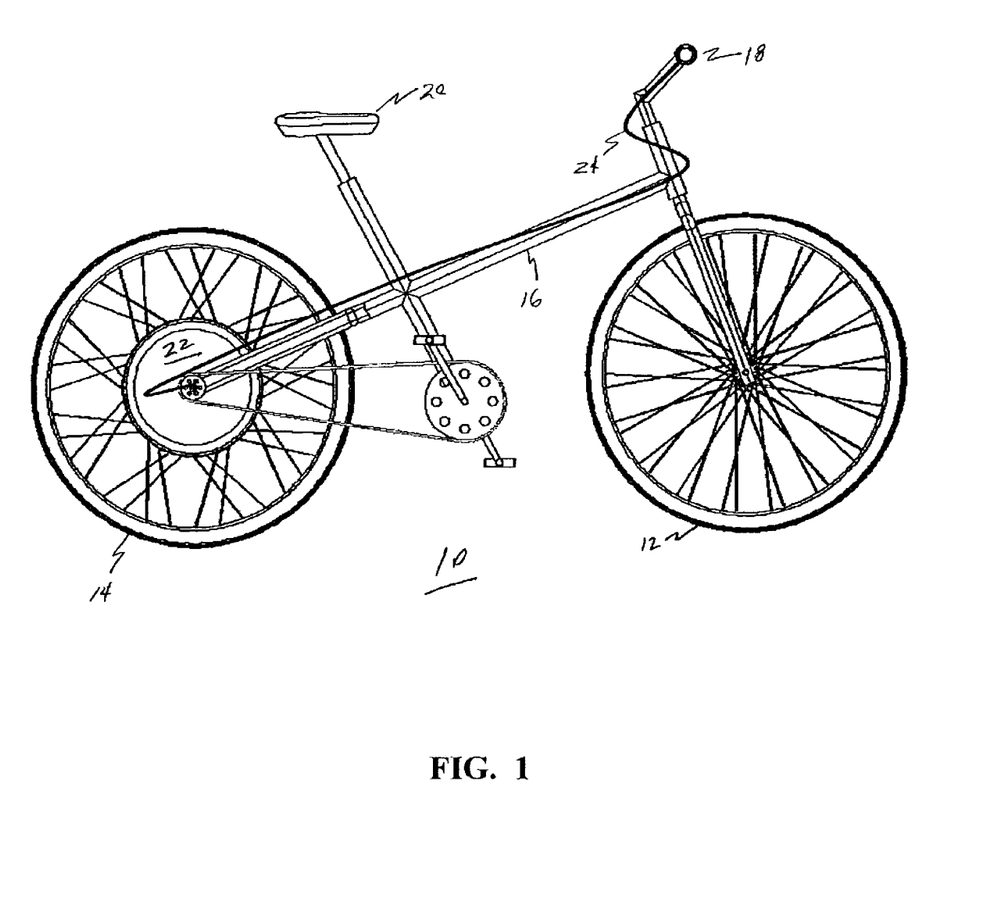
FIG. 1 is an illustration of a bicycle in accordance with the present invention.

FIG. 1 is illustrative of one example of the invention. Bicycle 10 comprises a front wheel 12 and back wheel 14 coupled to frame 16 through axles which are not shown. Also coupled to the frame are handle bars 18, of which only one is shown, and seat 20. Propulsion for the vehicle may be provided by a standard pedal and chain gear coupling with the rear wheel as well as an electric motor drive contained within hub area 22 in the rear wheel. As more particularly described below, the hub houses the motor, controller elements and power supply. Cable 24, mounted on frame 16 is connected between the hub a switch and throttle, not shown, at the handle bar. The operator may activate the motor drive by turning on the switch to complete a circuit for the motor, motor controller and power source via cable 24.

Figure 2:
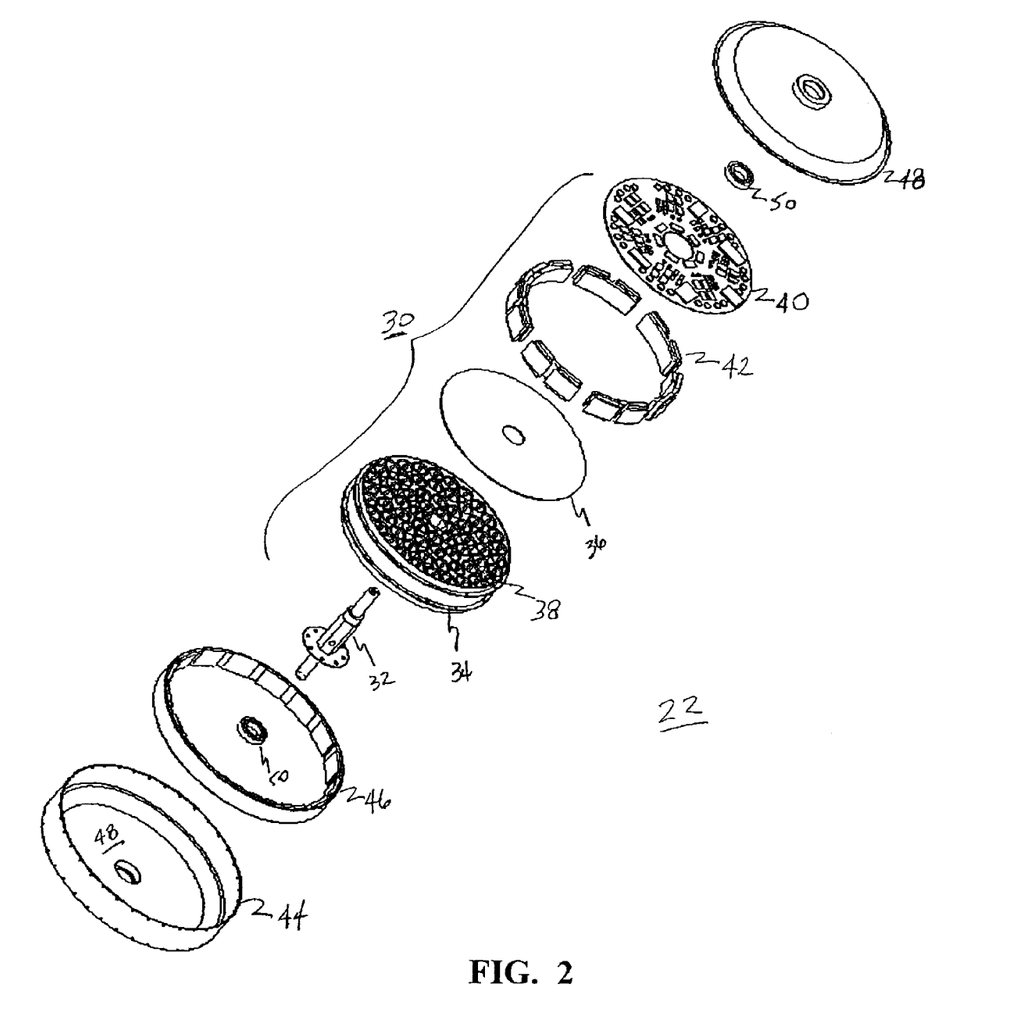
FIG. 2 is an exploded view of the structural components within a hub section of a wheel of the bicycle shown in FIG. 1.

FIG. 2 is an exploded view of the hub 22 and its internal structural components. The elements indicated by bracket 30, when assembled, are unitary with the bicycle frame 16, axle 32 being directly attached to the frame. Cylindrical stator frame 34, together with plates 36, only one of which is shown, define a space within which batteries 38 are to be housed. The batteries may be commonly available items, such as D-cells, that may be rechargeable. Plate 40 also forms part of the cylindrical stator frame structure and is representative of various circuit elements and circuit connections that provide motor controller operation for the various motor phase windings and battery charging, as well as connections to the batteries and cable 24. Reference is again made to the above-identified copending applications, previously incorporated by reference herein, for more detailed explanation of appropriate motor controller operation. Provision of one or more substrates, integrated circuit components, printed circuits, etc., is believed to be well within the skill of the artisan. The illustration of plate 40 is intended merely to depict the structural relationship of elements in accordance with the present invention.

A plurality of electromagnet stator segments 42 are positioned to be distributed about and mounted to the outer cylindrical surface of the stator frame 34. The electromagnet segments are ferromagnetically isolated from each other and, in operation, can each be separately controlled. Stator frame 34 is formed of a non-magnetic material, such as aluminum. Rotor frame 44 has an inner cylindrical surface upon which is to be mounted permanent magnet rotor 46. A back iron ring supports a plurality of distributed permanent magnets which need not be in abutting relationship with each other. Plates 48 and bearings 50 are part of the rotor assembly.

Figure 3:
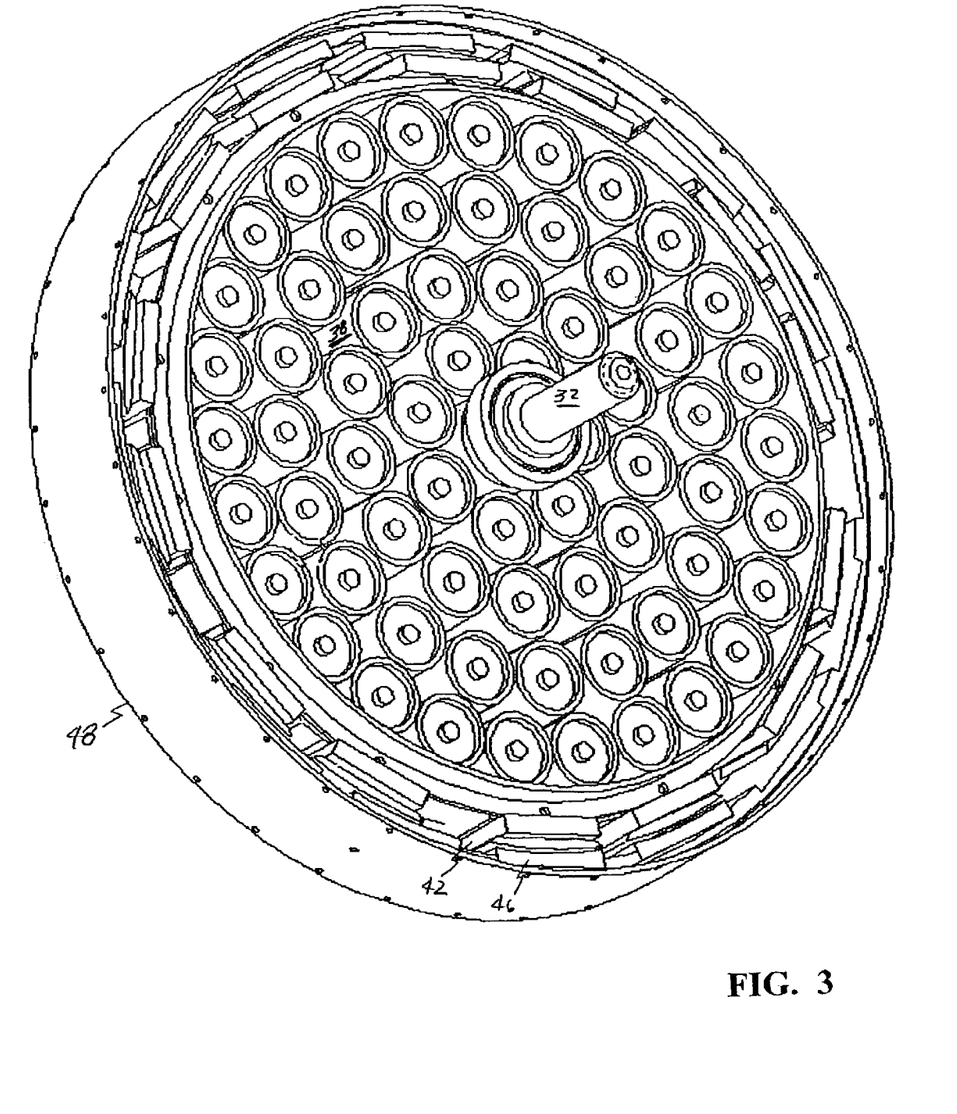
FIG. 3 is a three-dimensional perspective view of the motor structure and power supply batteries within the wheel hub in accordance with the present invention.
Figure 4:
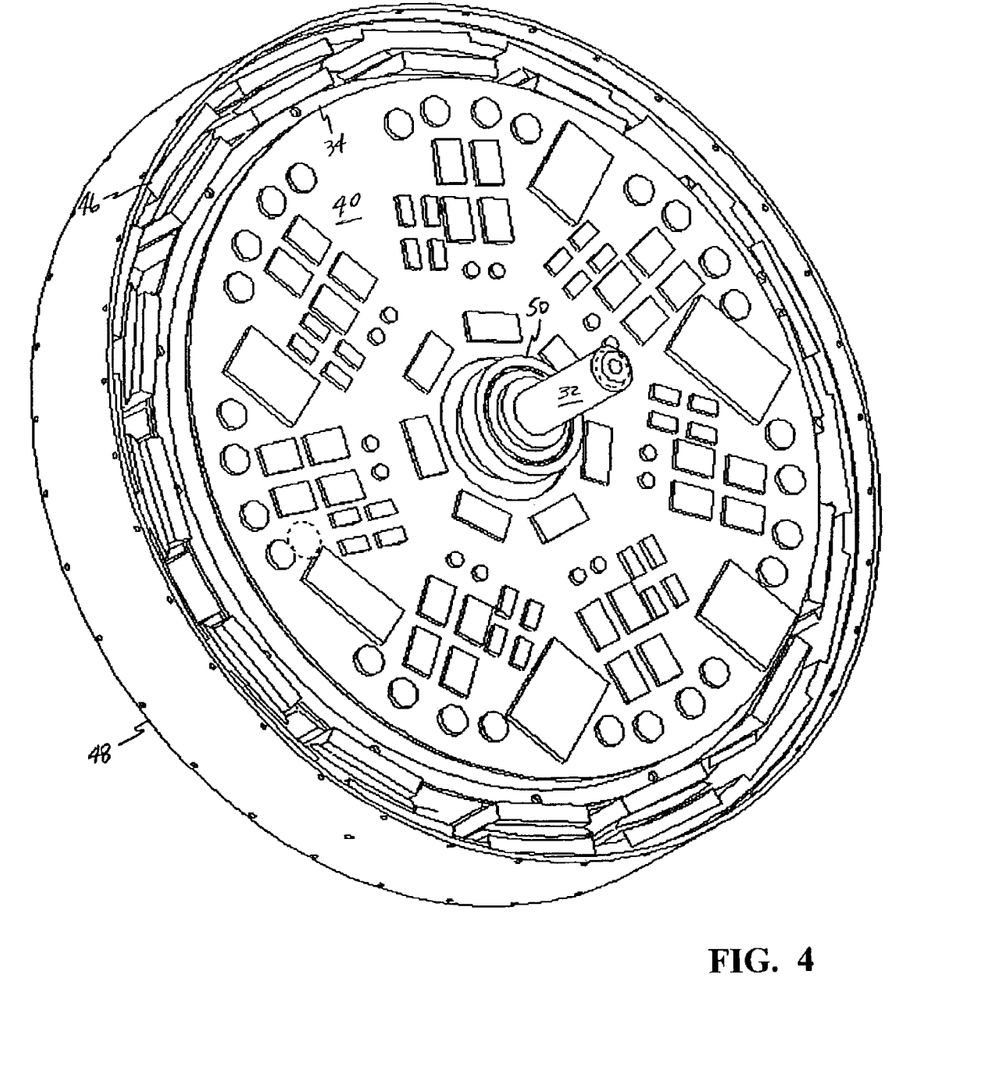
FIG. 4 is a three-dimensional perspective view of the motor structure and controller elements within the wheel hub in accordance with the present invention.
Figure 5:
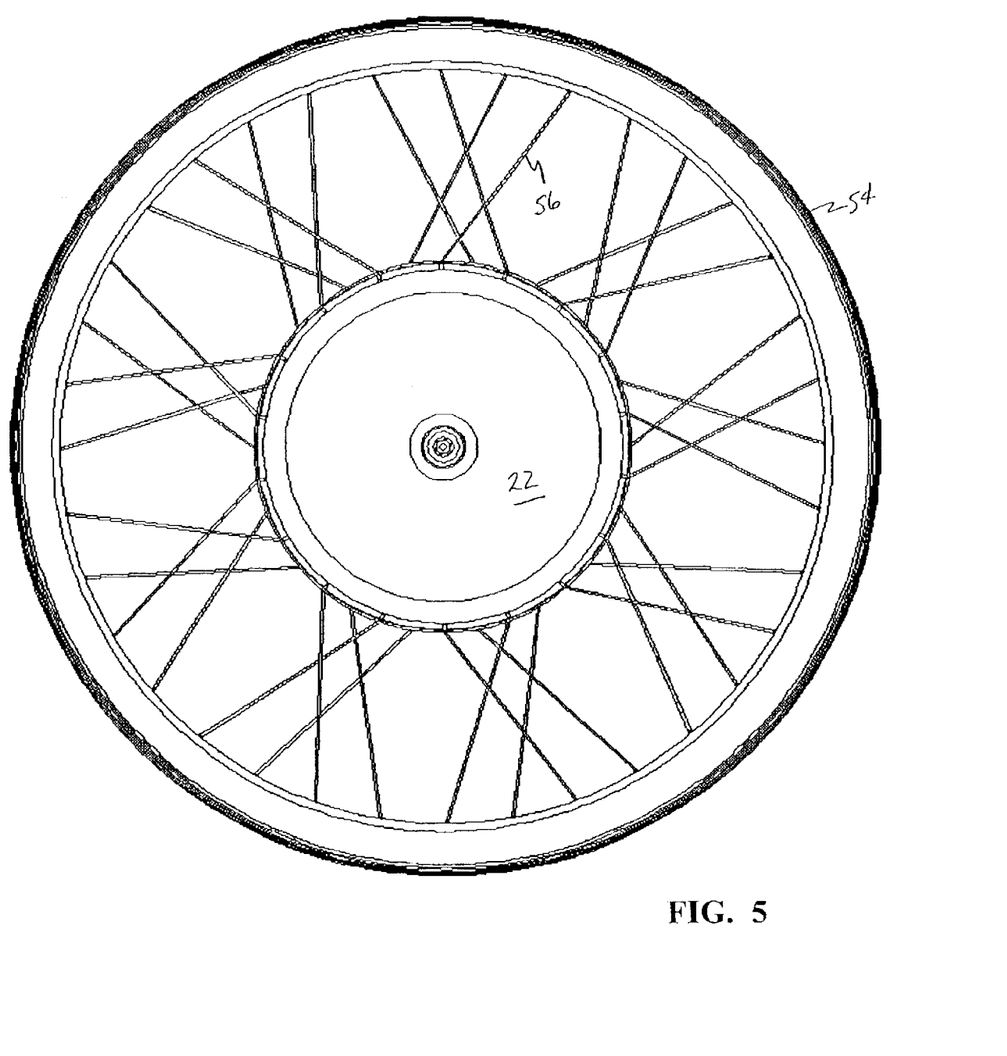
FIG. 5 is a view of the structural relationship between the hub section and the other wheel elements of the bicycle of FIGS. 1 and 2.

FIGS. 3 and 4 are three dimensional representations of the hub structure within outer plates 48. When assembled, the stator components form a cylinder having a relatively narrow width, the outer circumference bounded by the electromagnets. The rotor surrounds the stator to form a radial air gap between the stator electromagnets and the rotor permanent magnets. The outer plates 48 are mounted to the cylindrical frame 44 to enclosed the hub portion and are supported by the axle through bearings 50. As shown in FIG. 5, tire 54 may be mounted to the rotor frame 44 by spokes 56 in conventional manner. Rotation of the motor rotor thus provides propulsion to the tire 54.

Figure 6:
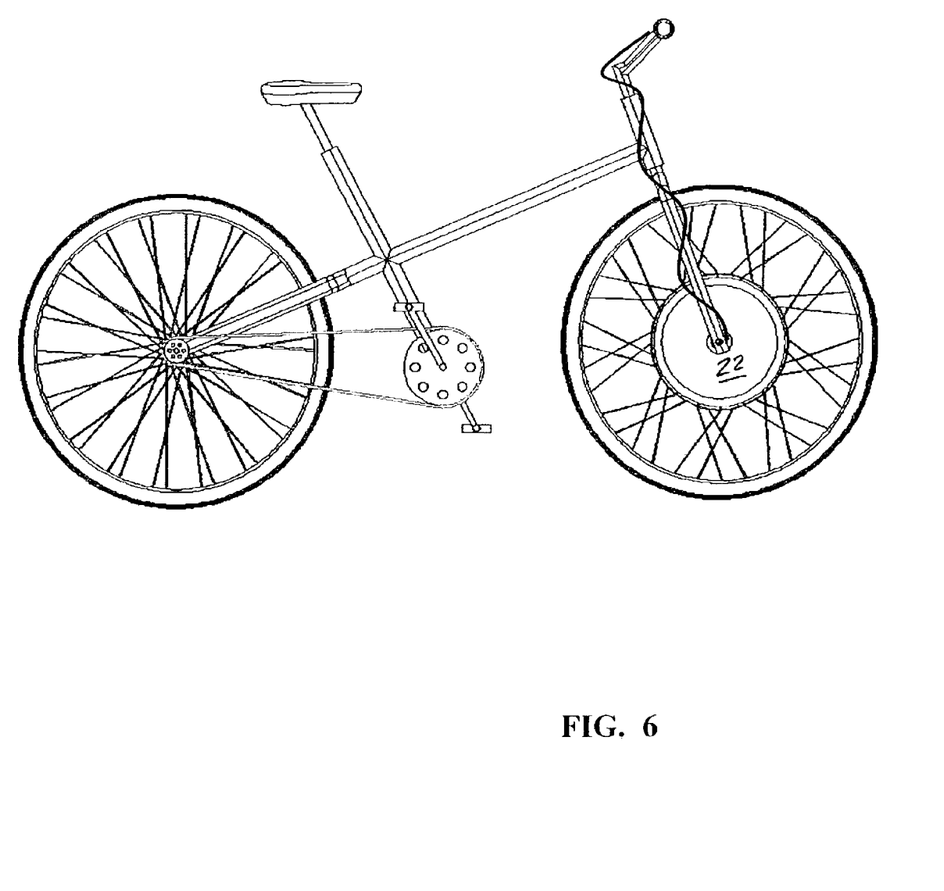
FIG. 6 is an illustration of a variation of the bicycle shown in FIG. 1.

In the embodiment of FIG. 1, the batteries, motor and control elements are all mounted in a hub of the rear tire. In the variation illustrated in FIG. 6 the hub arrangement is provided in the front tire. This arrangement permits use of a shorter length of cable. Being confined to the front portion of the vehicle, the cable is less likely to be entangled with the rider or the bicycle gear and chain apparatus. In addition, a convenience benefit is realized because the front wheel is more easily removed from (and reassembled with) the vehicle when battery replacement, recharging or motor and/or controller needs attention.

Figure 7:
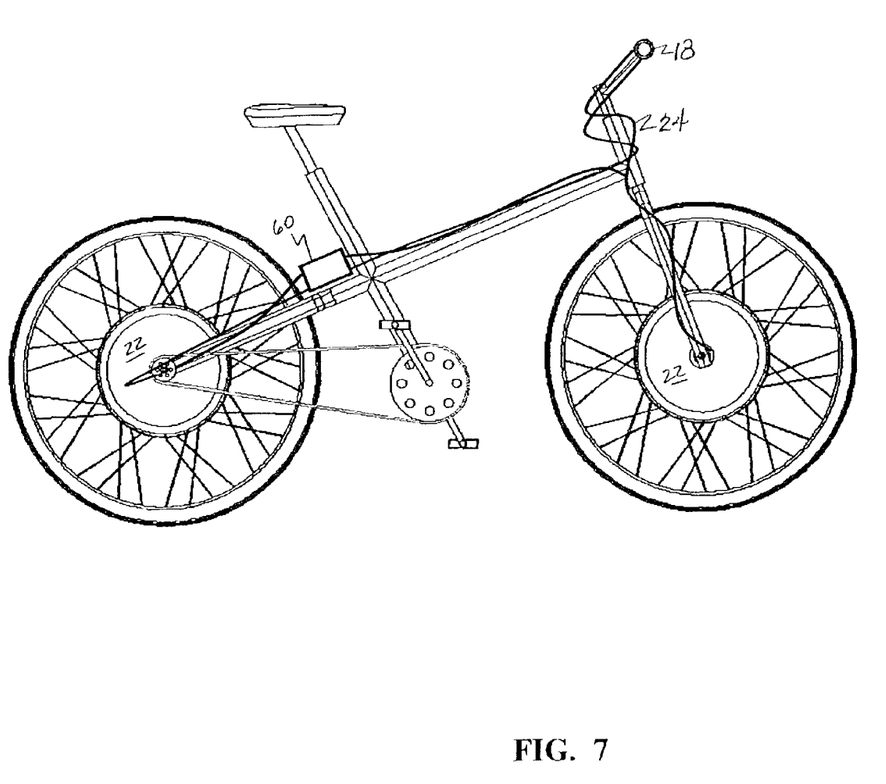
FIG. 7 is an illustration of another variation of the bicycle shown in FIG. 1.

An additional variation of the invention is depicted in FIG. 7. The vehicle of FIG. 7 differs from that of FIG. 1 in that an additional hub compartment is provided in the front wheel as well. The components within the front wheel hub may be similar to the components of the rear wheel hub, described above with respect to FIG. 3. Cable 24, supported by the vehicle frame, comprises electrical connections among both hubs and one or more switches at the handle bar 18. Switch 60 is in a line between both hubs. The operator, by selecting switch positions may activate motor propulsion in both front and rear wheels (all wheel drive), or motor propulsion for either rear wheel drive or front wheel drive. This functionality can be obtained through coordination between the switch 60 and the switch and throttle at the handle bar. Provision of appropriate switches and wiring interconnections is within the normal capability of a person of ordinary skill in the art. Merely by way of example, the handle bar switch may be a multiple switch and the switch 60 may be a single pole switch. Manual pedal propulsion is available as a backup. The chain may be disengaged from the rear hub during motor operation.

As an alternative variation of the above described arrangement of FIG. 7, one of the front or wheel hubs instead houses a reserve supply of batteries and recharging circuitry, without motor and motor controller elements. Electrical connections among the reserve supply batteries are arranged so that a parallel connection may be made via closure of switch 60 with the batteries in the motor hub. A greater power supply capacity is thus available for instances in which the batteries in the motor hub have diminished charge or when high load conditions are imposed. The additional energy source in combination with highly efficient motor operation permits travel for great distances in the intervals between battery replacement or recharging.

Figure 8:
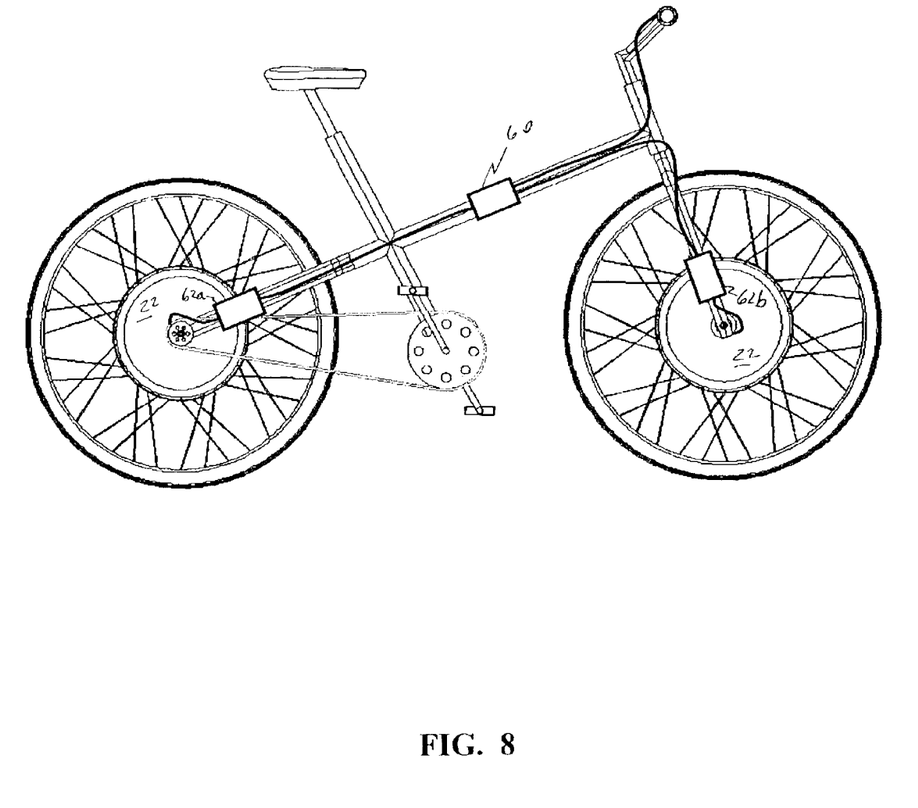
FIG. 8 is an illustration of a bicycle, such as shown in FIG. 7, with additional features in accordance with the present invention.

As an additional feature of the present invention, appropriate wiring can be provided within a wheel hub for connection of the batteries to terminals outside the hub for connection to a battery charger. Such a feature would be beneficial in avoiding the need to remove a wheel and dismantle the hub to replace the batteries. FIG. 8 illustrates, diagrammatically, external terminal boxes 62a and 62b, which are fixed to the bicycle frame adjacent the rear and front wheels, respectively. The terminal boxes contain appropriate terminal configurations for mating with any commonly available battery charging apparatus. Wiring is provided between the batteries within the hubs and the external terminal boxes. While FIG. 8 is illustrative of an embodiment in which batteries are contained in both wheels, it is contemplated that some applications may require batteries in only a single wheel, with the need for only one battery charging terminal.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, it is within the contemplation of the invention that the motor rotor frame may be coupled through bearings to the outer surface of the stator frame instead of to the axle. As a further alternative, the tire may be mounted directly to the rotor frame. The spokes would then be eliminated as the hub diameter is increased to the inner dimension of the tire. Such a modification, creates a greater space in which a more powerful motor and additional batteries can be housed.

What is claimed is:

1. An electrically powered vehicle comprising a wheel, said wheel comprising:

an axle;

a cylindrical stator frame fixed on the axle, an inner surface of the stator frame defining a space for housing a power supply;

a plurality of electromagnet stator segments mounted on and distributed about an outer surface of the stator frame, wherein said stator frame is non-magnetic and said electromagnet stator segments are ferromagnetically isolated from each other;

a cylindrical rotor frame coupled to the axle through bearings, an inner surface of the rotor frame supporting a plurality of permanent magnets distributed to surround the stator segments to form a radial air gap therebetween; and a tire mounted to an outer surface of the rotor frame, wherein the space in the cylindrical stator frame for housing the power supply is bounded in the radial direction by the axle and the inner surface of the stator frame and is bounded in the axial direction by a partition plate extending between the axle and the stator frame;

wherein the space in the cylindrical stator frame for housing the power supply is bounded in the radial direction by the axle and the inner surface of the stator frame and is bounded in the axial direction by a partition plate extending between the axle and the stator frame.

2. A vehicle as recited in claim 1, wherein the power supply comprises a plurality of battery cells.

3. A vehicle as recited in claim 2, wherein the plurality of battery cells are D-cells.

4. A vehicle as recited in claim 1, wherein the cylindrical stator frame space comprises control elements for driving the electromagnet stator segments.

5. A vehicle as recited in claim 4, wherein the cylindrical stator frame space further comprises battery recharging circuitry.

6. A vehicle as recited in claim 1, wherein the vehicle is a bicycle and the wheel is a rear wheel.

7. A vehicle as recited in claim 1, wherein the vehicle is a bicycle and the wheel is a front wheel.

8. A vehicle as recited in claim 1, wherein the plurality of electromagnet stator segments are spatially separated from each other.

9. A vehicle as recited in claim 1, wherein the plurality of permanent magnets are spatially separated from each other.

* * * * *

UNITED STATES PATENT AND TRADEMARK OFFICE
CERTIFICATE OF CORRECTION

PATENT NO. : 6,802,385 B2
DATED : October 12, 2004
INVENTOR(S) : Alexander V. Pyntikov et al.

It is certified that error appears in the above-identified patent and that said Letters Patent is hereby corrected as shown below:

Column 1,
Line 9, change "Ser. No. 09/996,102" to -- Ser. No. 09/966,102 --.

Signed and Sealed this

Twelfth Day of April, 2005

JON W. DUDAS
*Director of the United States Patent and Trademark Office*